United States Patent [19]

Pasch et al.

[11] Patent Number: 5,383,103
[45] Date of Patent: Jan. 17, 1995

[54] FLASHLIGHT WAND ATTACHMENT

[76] Inventors: Ricky C. Pasch, 915 W. County B2, Roseville, Minn. 55113; David R. Thomas, 10105 152nd St. North, Hugo, Minn. 55038

[21] Appl. No.: 124,724

[22] Filed: Sep. 21, 1993

[51] Int. Cl.⁶ ............................................ F21L 15/00
[52] U.S. Cl. .................................. 362/102; 362/109; 362/186
[58] Field of Search ............... 362/102, 109, 186, 190, 362/191, 352; 84/47, 73; 403/320, 341; 285/386, 387

[56] References Cited

U.S. PATENT DOCUMENTS

| | | | |
|---|---|---|---|
| 1,463,461 | 7/1923 | Davis | 285/386 |
| 2,823,300 | 2/1958 | Graubner | 362/186 |
| 4,231,077 | 10/1980 | Joyce et al. | 362/109 |
| 4,697,228 | 9/1987 | Mui et al. | 362/352 |
| 4,877,270 | 10/1989 | Phillips | 285/387 |
| 4,914,748 | 4/1990 | Schlotter, IV et al. | 362/109 |

*Primary Examiner*—Ira S. Lazarus
*Assistant Examiner*—Sara Sachie Raab
*Attorney, Agent, or Firm*—Nawrocki, Rooney & Sivertson

[57] ABSTRACT

A flashlight wand attachment including a wand member having a truncated generally conical portion and an opposing member. The attachment also includes threads for fastening the wand member to the opposing member when the wand member is disposed at one end of a wide portion or lamp housing of a handle member or flashlight, and the opposing member is disposed at an opposite end of the wide portion or lamp housing. Fastening the wand member to the opposing member in this way operably connects the wand attachment to the handle member. The present invention also includes a method of attaching a wand attachment to a flashlight.

13 Claims, 2 Drawing Sheets

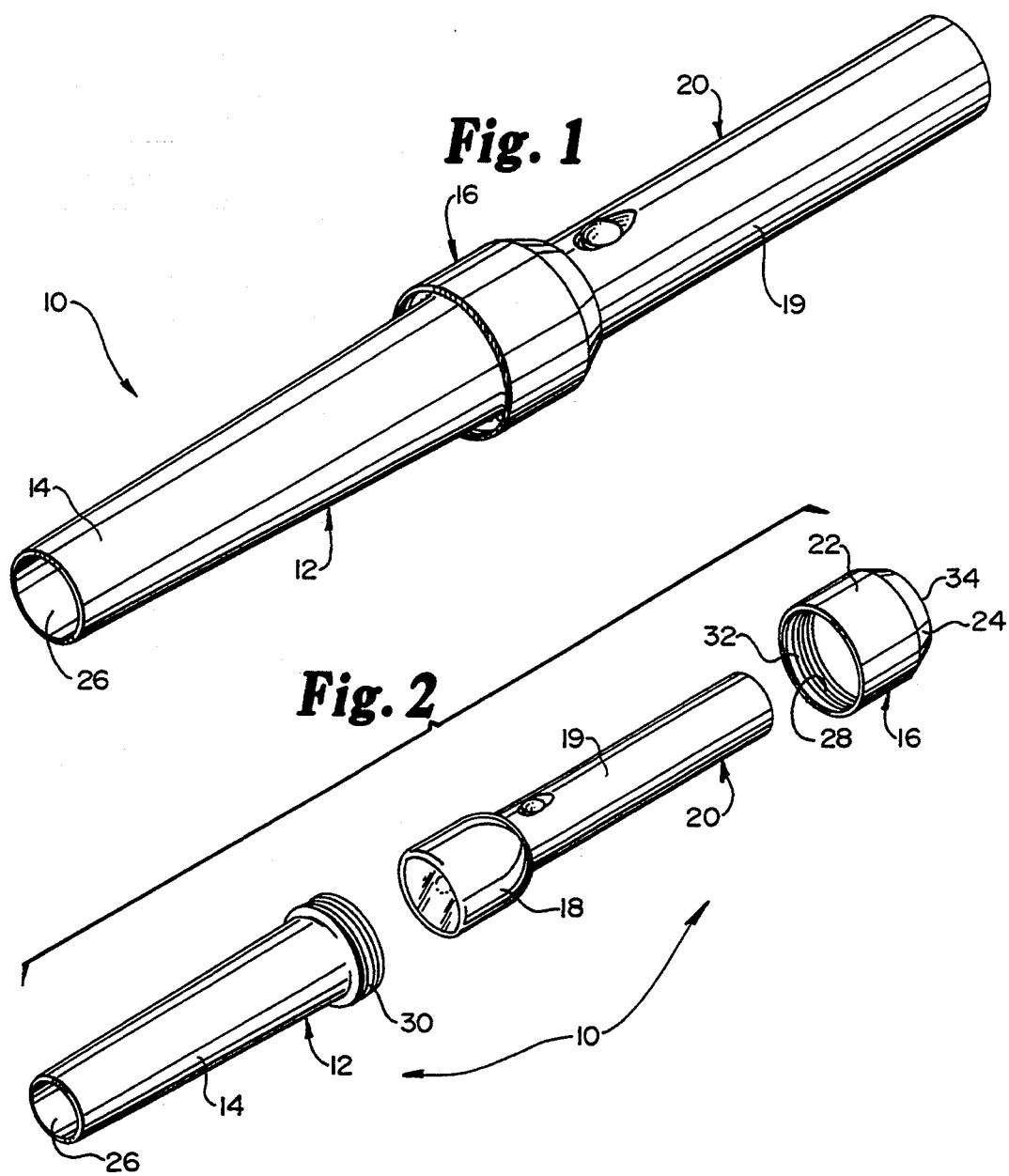

FLASHLIGHT WAND ATTACHMENT

TECHNICAL FIELD

The present invention pertains to a wand attachment for a flashlight or handle.

BACKGROUND OF THE INVENTION

Flashlight wand attachments are often used by police officers or airport ground crews to direct motor vehicle or airplane traffic, respectively. The wand attachments usually have a truncated, generally conical shaped member. The conical shaped member is preferably fabricated from a brightly colored translucent material and has a longitudinal opening extending from a wide end to a narrow truncated end. The wide end can be operatively connected to a lamp housing of a flashlight such that a beam of light emanating from the lamp housing can be directed into the longitudinal opening to illuminate the translucent conical member.

When the conical member is illuminated, it is particularly useful for directing traffic at night. The illuminating conical member is highly visible, and the conical shape acts as a pointer with the narrow truncated end indicating the desired direction of vehicle movement.

The wand attachment can also be used for directing traffic in daylight. During the day, the lamp, if one is used, need not be turned on because the brightly colored conical member is highly visible without illumination.

Prior wand attachments of a type as disclosed by Mui, et al. in U.S. Pat. No. 4,697,228 include a conical member having an internally threaded wide end. To fasten the conical member to a lamp housing, the wide end is threaded directly over an externally threaded portion of the lamp housing. When different flashlights are used, the diameter of the threaded portion of the lamp housing or spacing of the threads may vary. Consequently, the diameter and/or threaded spacing of the wide end of the conical member has to be able to be adapted accordingly. Consequently, for each different type of flashlight, a different conical member may have to be fabricated having threads sized to engage the threads on the lamp housing.

Another type of wand attachment includes a conical member having a wide end intended to be friction fit over a lamp housing. A metal retention ring is provided around the outside of the wide end of the conical member to provide an inwardly directed clamping force to ensure a tight friction fit.

Like the wand attachment disclosed by Mui, et al. this latter type of wand attachment is designed to fit a particular lamp housing. If a flashlight having a different lamp housing is used, a different conical member configured to fit the different lamp housing would have to fabricated. Concurrently, a different metal retention ring would also have to be used.

It is to these problems and dictates of the prior art that the present invention is directed. It is an improved wand attachment for mounting to an elongated implement such as a flashlight.

SUMMARY OF THE INVENTION

The present invention pertains to an improved wand attachment for an implement having an elongated grip and an expanded diameter portion which can be disposed proximate one end of the grip. The improved wand attachment can be fastened, for example, to several different size lamp housings of flashlights. The different size lamp housings might include those, for example, of the MagCharger TM flashlights or the Excalibre TM series of flashlights manufactured by Streamlight, Inc. For daytime use, the wand might also be fastened to a handle member having a shape similar to a flashlight, but not including a lamp and batteries.

The wand attachment of the present invention includes a wand member which can have a truncated, generally conical portion. The wand attachment also includes an opposing member and means for fastening the wand member to the opposing member. When the wand member is fastened to the opposing member, the wand member is disposed to one side of a lamp housing of a flashlight, in a flashlight application, and the opposing member is disposed on an opposite side of the lamp housing.

The opposing member may be a hollow collar member having a generally cylindrical portion and a truncated conical portion extending from one end of the cylindrical portion. The diameter of the conical portion generally decreases away from the cylindrical portion.

The wand member may be made from a translucent material and would typically include a longitudinal opening therethrough. Such a wand member may be attached to the lamp housing of the flashlight to illuminate the wand member.

The fastening means may include threading disposed on an inside surface of the collar member at an end thereof opposite the conical portion. The wand member may also include external threading to enable mating with the threading of the collar member.

In one embodiment, the collar member can have two oppositely disposed, coaxial openings. One opening is wider than the other. The wider opening has a diameter approximately equal to, but greater than, the maximum width of the lamp housing. The diameter of the other opening is less than the maximum width of the lamp housing and greater than the width of the grip.

The wand attachment preferably includes a multiple internal diameter wand member for attaching the wand attachment to at least two different widths of lamp housings. The wand attachment also preferably includes variable length attachment means for attaching the wand attachment to at least two different length lamp housings.

The present invention is thus an improved wand attachment for mounting, for example, to an elongated implement such as a flashlight. More specific features and advantages obtained in view of the features will become apparent with reference to the DETAILED DESCRIPTION OF THE INVENTION, appended claims, and accompanying drawing figures.

BRIEF DESCRIPTION OF THE DRAWINGS

FIG. 1 is a perspective view of a wand attachment in accordance with the present invention in combination with a flashlight;

FIG. 2 is an exploded view of the wand attachment and flashlight of FIG. 1;

DETAILED DESCRIPTION OF THE INVENTION

Figure 3:
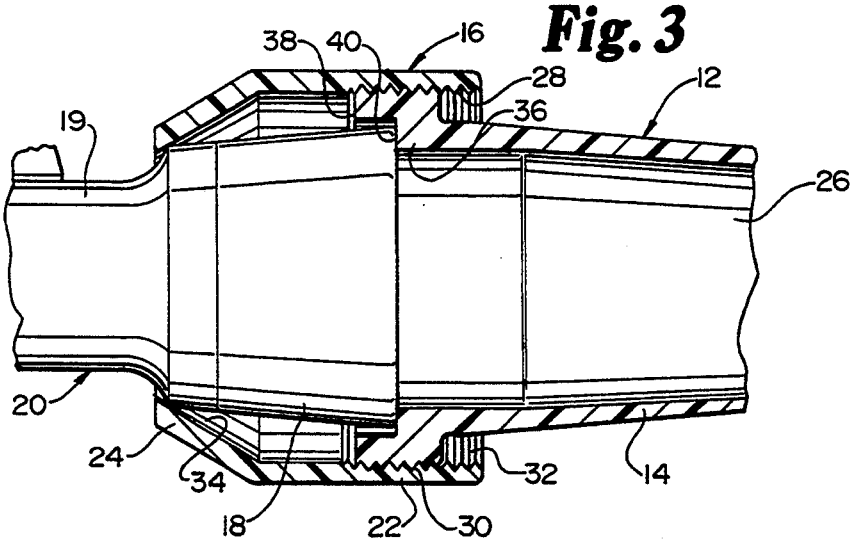
FIG. 3 is a cross-section of the wand attachment fastened to a first type of flashlight.

Referring now to the drawings wherein like reference numerals designate like elements throughout the several views, FIGS. 1 and 2 show a wand attachment 10 in accordance with the present invention in combination with a flashlight 20. Wand attachment 10 is shown as including a wand member 12 having a truncated conical portion 14.

Wand attachment 10 also includes an opposing member 16. Wand attachment 10, further, employs fastening means for fastening wand member 12 to opposing member 16.

When fastening wand member 12 to opposing member 16, wand member 12 is disposed at one end of an expanded portion of a handle member, or a lamp housing 18 of a flashlight 20, and opposing member 16 is disposed at an opposite end thereof, having been slid over a grip 19. Flashlight wand attachment 10 can be fastened to several different size lamp housings 18. The different sizes lamp housings might include those of the MagCharger TM flashlight, the Excalibre TM series of flashlights manufactured by Streamlight, Inc., or any other flashlight having similarly sized and configured lamp housing.

Wand member 12 and opposing member 16 are preferably made from blow molded plastic. Other suitable materials and methods of manufacture may be used and are well known in the art. Wand member 12 is preferably made from translucent brightly colored, for example red or yellow, plastic.

Opposing member 16 may be a hollow collar member having a generally cylindrical portion 22 and a truncated conical portion 24 extending from one end of cylindrical portion 22. Conical portion 24 generally decreases in diameter away from cylindrical portion 22.

Wand member 12 preferably includes a longitudinal opening 26 therethrough. When wand member 12 is attached to lamp housing 18, light emitted from lamp housing 18 of flashlight 20 into opening 26 illuminates the translucent wand member 12.

In one embodiment, fastening is accomplished by means of a threaded portion 28 disposed on an inside surface of collar member 16 at an end thereof opposite conical portion 22. Wand member 12 includes an externally threaded portion 30 for mating with threads 28.

The generally hollow collar member 16 may have two oppositely disposed openings 32 and 34. Opening 32 is wider than opening 34. The diameter of opening 32 is approximately equal to, but greater than, the maximum diameter of lamp housing 18. The diameter of opening 34 is less than the maximum diameter of lamp housing 18 and greater than the diameter of a grip portion 19 of flashlight 20.

Wand attachment 10 preferably includes attachment means for attaching wand attachment 10 to at least two different diameter lamp housings 18. Such attachment means employs a spacer step 36, which is shown as forming a proximal end of wand member 12, which has multiple inner diameters. Spacer step 36 is within wider opening 32 of collar member 16 between collar member 16 and lamp housing 18 to accommodate at least two different width lamp housings 18. Spacer step 36 is preferably cylindrical and integrally formed with conical portion 14 of wand member 12.

Figure 4:
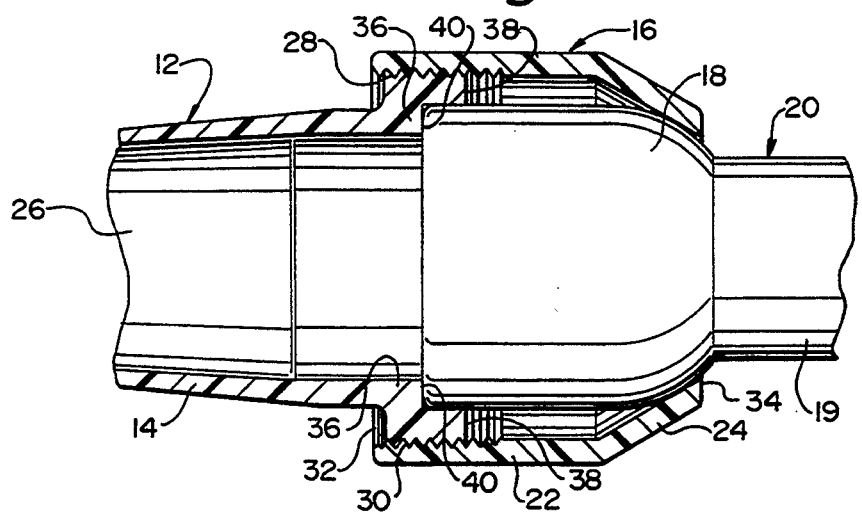
FIG. 4 is a cross-section of the wand attachment fastened to a second type of flashlight.
Figure 5:
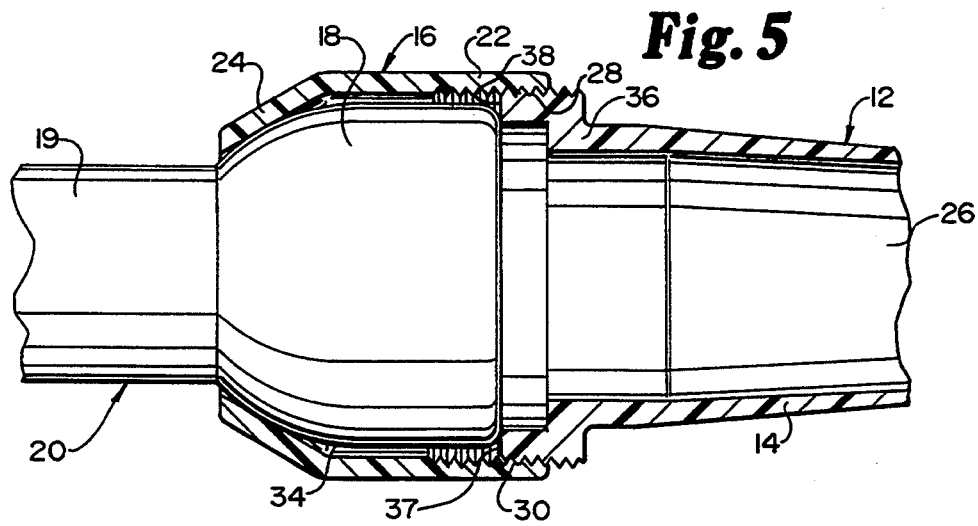
FIG. 5 is a cross-section of a wand attachment fastened to a third type of flashlight.

As shown in FIGS. 3 and 4 spacer step 36 is defined between collar member 16 and lamp housing 18 to reduce the width or diameter of opening 32 of collar member 16. In FIG. 5, flashlight 20 has a wider lamp housing 18 with a width approximately equal to, but less than, the width of opening 32 of collar member 16. In that figure, lamp housing 18 is wide enough that spacer step 36 need not be interposed between collar member 16 and lamp housing 18.

Wand attachment 10 may also include means to enable attaching wand attachment 10 to at least two different length lamp housings 18. As shown in FIGS. 3–5, the attachment means preferably include a shoulder 38 of spacer step 36 and cooperating with a shoulder 40 of conical portion 14 both of wand member 12.

As shown in FIGS. 3 and 4 an end of lamp housing 18 abuts shoulder 40 of conical portion 14 to hold lamp housing 18 between wand member 12 and collar member 16. Lamp housing 18, in FIG. 3, is shorter and has a somewhat different configuration than lamp housing 18, in FIG. 4. Thus, wand member 12 is inserted or threaded further into collar member 16 in FIG. 3 than in FIG. 4.

As shown in FIG. 5, an end of lamp housing 18 abuts shoulder 38 of spacer portion 36. In FIG. 5 wand member 12 is inserted or threaded far enough into collar member 16 to hold lamp housing 18 between shoulder 38 and collar member 16.

In use, wand attachment 10 is attached to flashlight 20 by placing wand member 12 at the distal end of lamp housing 18 of flashlight 20. Opposing member or collar member 16 is positioned at an opposite end of lamp housing 18 by sliding collar member 16 over grip 19. Then wand member 12 is threaded onto opposing member or collar member 16. It will be understood that wand attachment 10 might also be fastened to handle member for daytime use, wherein the handle member has a shape similar to flashlight 20 but does not include a lamp and batteries.

To secure wand portion 12 to opposing member 16, wand member 12 is threaded into collar member 16. A shoulder 38, 40 of wand member 12 is abutted against an end of lamp housing 18 to hold lamp housing 18 between wand member 12 and collar member 16. As discussed above, spacer step 36 may be received between housing 18 and collar member 16 to reduce the effective width of opening 32.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A wand attachment for a flashlight, including a handle portion having a first diameter, and an axially aligned lamp housing having a second diameter larger than the first diameter, comprising:
   a wand member having a generally conical portion and proximal and distal ends;
   an opposing member; and
   means for attaching the wand member to the opposing member when the wand member is disposed in engagement, at said proximal end, with one axial end of the flashlight lamp housing, having a central longitudinal axis, and the opposing member is disposed in engagement with an opposite axial end of the lamp housing so that the wand attachment is secured to the flashlight.

2. A wand attachment in accordance with claim 1, wherein the wand member includes a longitudinal opening therethrough and the wand member is made from translucent material so that light emitted from the lamp housing of the flashlight into the opening can illuminate the wand member.

3. A wand attachment in accordance with claim 1, further comprising multiple width means for interchangeably attaching the wand attachment to lamp housings of at least two different flashlights with lamp housings having different widths, the multiple width means being carried by the wand member proximate said proximal end, and the width of a lamp housing being generally perpendicular to a longitudinal axis of the flashlight.

4. A wand attachment in accordance with claim 1, further comprising multiple length means for interchangeably attaching the wand attachment to lamp housings of at least two different flashlights with lamp housings having different lengths, the multiple length means being carried by the wand member proximate said proximal end, and the central longitudinal axis of the lamp housing being approximately parallel to a longitudinal axis of the flashlight.

5. A wand attachment, comprising:
a wand member having a truncated generally conical portion and two opposite axial ends;
a hollow collar member having a generally cylindrical portion and a truncated conical portion extending from one axial end of the cylindrical portion, the conical portion of the collar member generally decreasing in diameter away from the cylindrical portion of the collar member; and
means for fastening the wand member to the collar member when the wand member is disposed with one axial end thereof at one end of a lamp housing of a flashlight and the conical portion of the collar member is disposed at an opposite end of the lamp housing so that the wand member can be operatively connected to the flashlight.

6. A wand attachment in accordance with claim 5, the wand member including a longitudinal opening therethrough and being made from translucent material so that light emitted from the lamp housing of the flashlight into the opening illuminates the wand member.

7. A wand attachment in accordance with claim 5, the fastening means including a threaded portion disposed on an inside surface of the cylindrical portion of the collar member opposite the conical portion of the collar member, for threaded mating with a threaded portion of the wand member.

8. A wand attachment in accordance with claim 5, further comprising multiple width means for attaching the wand attachment to at least two different diameter lamp housings, the multiple width means being connected to the wand member proximate one end of the wand member.

9. A wand attachment in accordance with claim 5, the collar member having two oppositely facing openings into the hollow collar member, one opening being wider than the other, the wider opening having a width being approximately equal to, but greater than, the maximum width of the lamp housing, the other opening having a width being greater than the maximum width of a grip of the flashlight.

10. A wand attachment in accordance with claim 9, the wand member including a spacer step formed within a wider axial end thereof and between the collar and the lamp housing to provide multiple widths to accommodate at least two different diameter lamp housings.

11. A wand attachment in accordance with claim 10, the spacer step being annular and integrally formed with the conical portion.

12. A wand attachment in accordance with claim 5, further comprising multiple length means for attaching the wand attachment to at least two different length lamp housings, the multiple length means being carried by the wand member proximate one axial end of the wand member.

13. A wand attachment for a flashlight, including a handle portion having a first diameter and an axially aligned lamp housing having a second diameter larger than the first diameter, comprising:
a wand member having proximal and distal ends;
an opposing member; and
means for attaching the wand member to the opposing member when the wand member is disposed in engagement, at said proximal end, with one axial end of the flashlight lamp housing, having a central longitudinal axis, and the opposing member is disposed in engagement with an opposite axial end of the lamp housing so that the wand attachment is secured to the flashlight.

* * * * *